United States Patent Office 3,113,142
Patented Dec. 3, 1963

3,113,142
RING CONTRACTION PROCESS AND PRODUCTS MANUFACTURED THEREBY
Jerrold Meinwald, Ithaca, N.Y., assignor to Schering Corporation, Bloomfield, N.J., a corporation of New Jersey
No Drawing. Filed Jan. 12, 1962, Ser. No. 165,951
16 Claims. (Cl. 260—397.3)

This invention relates to a method for contracting a trans-fused cyclopentane to a trans-fused cyclobutane and to novel and useful products manufactured thereby. More particularly, this invention relates to the conversion of a steroid to a D-nor steroid.

The process may be considered as the transformation of a 17-keto steroid to a D-nor steroid possessing a carboxyl group (or derivative thereof) attached to the 16-position.

At the outset, it will be necessary to establish a system of nomenclature bearing some relationship to presently known systems. The D-nor steroids produced by my process possess a carbon-skeleton ring system as shown in Formula I:

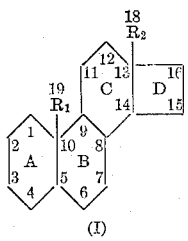

(I)

The rings are identified in the manner of conventional steroid nomenclature. Similarly, the carbon atoms of rings A, B, and C are conventionally identified. In ring D, C-17 has been eliminated whereby C-16 is directly bonded to C-13. The angular groups attached to positions 10 and 13 retain conventional numbering and as shown, $R_1$ and $R_2$ represent methyl or hydrogen.

In the conventional steroid nucleus, the six-membered C-ring is fused to the five-membered D-ring in the trans configuration. The D-nor steroid of the instant invention also possesses the trans configuration between the C-ring and the now contracted D-ring. The success of the conversion of a 6–5 trans-fused ring system to a 6–4 trans-fused ring system is most surprising in view of the strains created by contracting the five-membered ring. Indeed, it has not been known heretofore that a 6–5 trans-fused system could be transformed to a 6–4 trans-fused ring system.

My novel process therefore may be depicted by reaction scheme A:

(A)

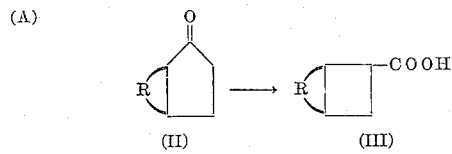

(II)        (III)

whereby a 17-keto steroid (II) is transformed into a 16β-carboxy-D-nor steroid (III). In II and III, above, R represents the A, B, and C rings of a steroid which may include the angular methyl groups attached to C-10 and C-13. The starting material II, may be any 17-keto steroid having an active methylene group at C-16; that is, the 16-position must be unsubstituted except by hydrogen. The reason for such requirement for no substitution at C-16 becomes apparent from the later detailed discussion of the process which involves the formation of an intermediate 16-diazo-17-keto compound.

Although the process, as shown in reaction A, results in the formation of a carboxylic acid (III), it is to be understood that such representation is made merely for clarity. Indeed, the end product of the process may be a carboxylic acid or a derivative thereof, such as an ester or amide. The actual product is determined by the choice of reactant solvent employed.

In detail, my process is represented by the following reaction scheme B (R, as stated above, being the A, B, and C rings of a steroid):

(B)

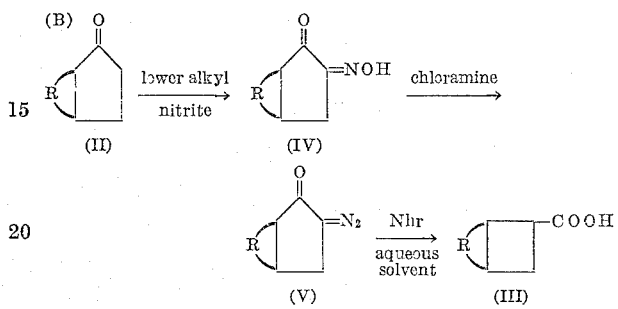

In order to prepare the α-diazo ketone (V), any of several general methods may be employed. I prefer, as shown in B, to oximinate a 17-keto steroid so as to form the α-oximino ketone, IV. The α-oximination is effected by reacting the 17-keto steroid with a lower alkyl nitrite in the presence of a base, such as an alkoxide. Although any of the conveniently prepared alkyl nitrites may be utilized such as methyl, ethyl, the two propyl nitrites, the butyl and amyl nitrites, I prefer to employ isoamyl nitrite as the reactant. This reaction lends itself to acid catalysis as well as the mentioned base catalyzed method.

Processing according to conventional techniques yields the oximino ketone, IV. The oximino ketones are generally high melting crystalline solids which are crystallizable from polar solvents such as alcohols, nitriles and the like.

The conversion of the α-oximino ketone (IV) to the α-diazo ketone, (V) is carried out by conventional methods. I prefer to treat the oxime with chloramine in ether solution and purify the diazo ketone formed by recrystallization from alcohol. The chloramine can be prepared either independently or in situ. The α-diazo ketones are yellow crystalline substances having high melting points.

The key step in my process is the transformation of the α-diazo ketone (V) to a 16β-carboxy-D-nor steroid (III). This step is effected by irradiating the diazo ketone in an appropriate solvent with an appropriate light energy source. As to the solvent, any organic solvent substantially transparent to ultraviolet light is suitable, such as tetrahydrofuran or dioxane. It is believed that the diazo ketone, upon irradiation, is first converted to a cyclobutanoid ketene. Thus in order to produce the carboxylic acid (III), the photolysis solvent is mixed with water which reacts with the ketene. If alcohols or ammonia derivatives, such as amines, are present in place of water, the corresponding carboxylic acid ester or amide is produced.

The light source may be any of the conventional ultraviolet emitters. It appears that the upper regions of the ultraviolet band bordering on the visible range are of greater value for this reaction than the lower end of the band. Accordingly, ordinary glass equipment may be utilized for containing the reaction mixture.

During the reaction, nitrogen is evolved. Indeed, the completion of the reaction may be determined by measuring the evolved nitrogen. If desired, a blanket of an inert gas or non-reactive gas such as nitrogen or carbon dioxide may be placed above the liquid reaction medium.

During the photolysis, heat may be generated causing a rise in temperature of the reaction medium. I generally permit the temperature to rise slightly above room temperature; however, cooling may be employed and may aid to effecting a reaction having less side products.

Where a carboxylic acid is being produced, the product is isolated by extraction techniques utilizing alkaline media to separate the acid component. The esters and amides are isolated preferably by pouring the mixture into a large volume of water and extracting with an appropriate solvent.

The process described heretofore has been set forth as applicable to any 17-keto steroid having an unsubstituted C–16 position. The starting material has been depicted as

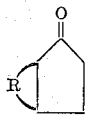

with R representing the A, B, and C rings of the 17-keto steroid. These rings may contain various substituents such as are normally found and described in conjunction with steroids. Keto groups may be present at C–3, C–11, and elsewhere. Hydroxyl groups or esters thereof may be present at C–3, C–11, and elsewhere. Alkyl groups may be present at C–2, C–6 and elsewhere. Halogen may be present at C–2, C–4, C–9, C–11 and elsewhere. Unsaturation may be present in any of the rings either separate and distinct, or in conjugation. The only limitation as to the structure of the starting material is that there be no activated methylene group as active to an oximinating agent as is the 16-methylene group. Such a group would exist, for example, in a 3,17-diketo-androstane. Under such circumstances, prior to oximination, it would be necessary to deactivate the methylene group or groups adjacent to the 3-keto group by selectively forming a ketal or enamine at C–3. In the case of an 11-keto group, no protection is necessary in view of the steric inhibitory effect manifest in the C–ring. My process thus is applicable to the conversion of androstanes ($5\alpha$ and $5\beta$) and 19-nor-androstanes (estranes) which possess groups such as 3-hydroxyl (both $\alpha$ and $\beta$) and esters thereof, 3-keto, 3-keto-$\Delta^4$, 3-keto-$\Delta^{1,4}$, 3-hydroxy (or acyloxy)-$\Delta^5$, 11-($\alpha$ and $\beta$) hydroxy, 11-keto, halogen at 2, 4, 6, 9 and/or 11, and the like, to the corresponding $16\beta$-carboxy-D-nor analog. Thus by my process I can prepare $3\beta$-hydroxy-$16\beta$-carboxy-D-nor-androstane from $3\beta$-hydroxy-17-keto-androstane, $3\beta$-hydroxy-$16\beta$-carboxy-D-nor-5-androstene from $3\beta$-hydroxy-17-keto-5-androstene. Similarly from estrone there is obtained 3-hydroxy-$16\beta$-carboxy-D-nor-1,3,5-estratriene.

The D-nor steroids produced by my D-ring contracting process are useful chemical substances. As chemical intermediates, they serve as building blocks for ultimate preparation of D-nor-pregnanes and androstanes having hormonal type properties. For example, transformations similar to those used in the known conversion of etiocholanic acid and etiocholenic acid to progesterone and even to corticoids such as cortisone and hydrocortisone can be effected on my D-nor steroids (as described in my copending application Serial No. 165,952, filed January 12, 1962) whereby a $3\beta$-hydroxy-$16\beta$-carboxy-D-nor-androstane is transformed into the analogous D-nor progesterone or D-nor corticoid.

Similarly, cyclobutanoid analogs of the estrane and androstane series such as D-nor-estradiol and D-nor-testosterone are prepared by converting the 16-carboxyl group to a hydroxyl group by known techniques, for example, starting with 16-oximino-5-androstene-$3\beta$-ol-17-one and following my process as described herein, there is produced the analogous D-nor substance, $3\beta$-hydroxy-$16\beta$-carboxy-D-nor-5-androstene. The hydroxyl group at C–3 is protected by ester formation and the D-nor steroid is treated in turn with oxalyl chloride and then dimethyl cadmium, giving rise to D-nor-5-pregnene-$3\beta$-ol-20-one.

Degradation of the D-nor pregnene is effected by the Baeyer-Villiger oxidation using perbenzoic acid and the 3,16-diacetate is hydrolyzed to yield D-nor-5-androstene-$3\beta$,$16\beta$-diol, Oppenauer oxidation of the $3\beta$-OH group results in the formation of D-nor testosterone. In this series of reactions, it is necessary to protect the $\Delta^5$-bond against oxidation. Proper protection is afforded by halogenation of the bond (preferably with chlorine) followed by dehalogenation with zinc, for example, after the oxidation step. It is thus apparent that the products of my process lend themselves to a wide variety of reactions and transformations. Further, some of the products appear to have interesting physiological activity. For example, it has been found that $3\beta$-hydroxy-$16\beta$-carboxy-D-nor-androstane exhibits both estrogenic and androgenic manifestations in small animals. This substance accordingly is a valuable research tool for the laboratory pharmacologist.

My process is not limited to contracting the D-ring of steroids, but indeed is applicable to the contraction of any trans-fused $\alpha$-diazo-cyclopentanone so as to form the analogous trans-fused cyclobutane carboxylic acid. As with the steroids, the character of the ring or ring system trans-fused to the $\alpha$-diazoketone is immaterial provided that no reactive methylene groups are present. The ring or ring system so trans-fused may be carbocyclic or heterocyclic with one or more hetero atoms per ring. The hetero atoms may be O, S, N, as well as others which do not react under the influence of ultraviolet radiation. The trans-fused $\alpha$-diazo cyclopentanones are prepared as described herein from a trans-fused cyclopentanone. There is thus produced trans-fused cyclobutanoid carboxylic acids, esters and amides.

Thus from trans-hexahydroindanone-1 there is obtained transhexahydro-2,3-benz-cyclobutane carboxylic acid.

As indicated above, more than one ring can be transfused such as a ring system which may contain various hetero atoms. These products produced by my process are useful as research tools and building blocks in organic synthesis as is readily apparent to one skilled in the art. For example, certain unfused cyclobutane compounds are known to be physiologically active such as the $\beta$-cyclobutane propionic acids which are antibacterial. By my process, fused ring analogs of such compounds are now preparable by converting the carboxylic acid to the propionic acid, according to conventional means for increasing the chain length of a carboxylic acid.

The following examples are illustrative of my novel process and some of the novel compounds produced thereby, and are not to be construed as limiting the scope thereof; the scope of my invention being limited only by the appended claims.

PREPARATION 1

*General Method for Preparation of $\alpha$-Oximino-Ketones*

Dissolve 1 mole of potassium in about 1 l. of anhydrous t-butanol. Stir and add a solution of 1 mole of the transfused cyclopentanone. Continue stirring and dropwise add 1 mole of isoamyl nitrite. Stir reaction for several hours and then pour into water. Extract the mixture with methylene chloride and discard the extracts. Acidify the aqueous phase and extract with ether. Cool and dry the ether extracts and evaporate to a residue consisting of the $\alpha$-oximino-ketone.

PREPARATION 2

*General Method for Preparation of $\alpha$-Diazo-Ketones From $\alpha$-Oximino-Ketones*

Dissolve 1 mole of the $\alpha$-oximino-ketone (from Preparation 1) in excess aqueous potassium hydroxide. Cool to 5° C. and add an excess of chloramine in ether. Stir for several hours and separate the yellow ether layer. Repeat treatment of the aqueous phase with ethereal chloramine. Combine the ethereal portions, wash with water, dry over anhydrous magnesium sulfate. Evaporate to a residue yielding crude α-diazo ketone.

PREPARATION 3

*General Method for Preparation of Trans-Fused Cyclobutane Carboxylic Acid From α-Diazo-Ketone*

With a low energy source of ultraviolet light irradiate a dioxane-water (4:1) solution of the α-diazo-ketone (5% concentration). When evolution of nitrogen has ceased, concentrate the solution to about one third volume. Dilute the concentrate with water, add excess alkali and extract with methylene chloride. Discard the extracts. Acidify the aqueous phase and extract with ether. Dry the ether solution and evaporate to a residue consisting of crude product.

In order to prepare a 16-carboxy ester, the dioxane-water solvent is replaced by dioxane-alkanol, the alkanol being the desired alcohol component of the ester such as methyl, ethyl or other aliphatic alcohols. The ester is obtained by dilution and extraction.

Similarly, by employing a solution of an amine such as ammonia, lower di-alkylamines, piperidine, pyrolidine, morpholine, and the like, in admixture with dioxane or tetrahydrofuran, the corresponding 16-carboxamide is produced.

Alternatively, the ester of a trans-fused cyclobutane carboxylic acid is prepared by treating the 16-carboxylic acid via conventional techniques, such as with diazomethane whereby the 16-carbomethoxylate is obtained.

PREPARATION 4

*Selective Ethylene Ketal Formation*

Distill slowly through a fractionating column for 5½ hours, a solution of 1 g. of 4-androstene-3,11,17-trione and 15 mgm. of p-toluenesulfonic acid in 16 ml. of pure 2-methyl-2-ethyl-1,3-dioxolane. (Total distillate of about 10 ml. is discarded.) Cool the reaction mixture, dilute with benzene, wash with 5% aqueous sodium bicarbonate then water, dry over magnesium sulfate, then concentrate under reduced pressure to a residue. Crystallize the residue from methanol containing a drop of pyridine yielding 4-androstene-3,11,17-trione 3-ethylene ketal.

Similarly, 4-androstene - 11β - ol-3,17-dione reacted with 2-methyl-2-ethyl-1,3-dioxolane in the above manner, yields 4-androstene-11β-ol-3,17-dione 3-ethylene ketal.

EXAMPLE 1

*16-Oximino-Androstane-3β-ol-17-One*

Dissolve 28.4 g. of potassium in 1 l. of dry t-butanol. Add 28 g. of androstane-3β-ol-17-one and stir vigorously for one hour. Add 20 ml. of isoamyl nitrite and continue stirring for 8 hours. Add 20 ml. additional of isoamyl nitrite and stir overnight. Add an equal volume of water and acidify with 3 N hydrochloric acid. Extract thoroughly with ether. Wash ether solution with potassium carbonate solution, exhaustively extract the ether solution with 0.5 N potassium hydroxide. Warm the alkaline solution to remove ether and then cool and filter. Acidify the filtrate with 3 N hydrochloric acid. Collect the precipitate, 16-oximino-androstane-3β-ol-17-one, on a filter and dry: yield 24.9 g., M.P. 222–223° C.

In order to obtain products such as set forth in the following table, utilize the starting materials set forth therein and employ the directions set forth above; with the additional step, in the case of those starting compounds possessing a 3-ketal function, of hydrolyzing the 3-ketal group with 80% acetic acid. Thus, the second starting compound listed below, i.e. androstane-3,17-dione 3-ethylene ketal, after reaction and isolation according to the above described procedure yields 16-oximino-androstane-3,17-dione 3-ethylene ketal. Addition of about 20 ml. of 80% aqueous acetic acid per gram of 16-oximino-androstane and heating of this acetic acid mixture on a steam bath for one hour followed by cooling, dilution with water, and separation by filtration of the resultant precipitate, yields 16-oximino-androstane-3,17-dione, the product B listed below.

TABLE I

| Starting Material | Product |
| --- | --- |
| Androstane-3α-ol-17-one | 16-Oximino-androstane-3α-ol-17-one (A). |
| Androstane-3,17-dione 3-ethylene ketal. | 16-Oximino-androstane-3,17-dione (B). |
| 4-Androstene-3,17-dione 3-ethylene ketal. | 16-Oximino-4-androstene-3,17-dione (C). |
| 5-Androstene-3β-ol-17-one | 16-Oximino-5-androstene-3β-ol-17-one (D). |
| 4-Androstene-3,11,17-trione 3-ethylene ketal. | 16-Oximino-4-androstene-3,11,17-trione (E). |
| 4-Androstene-11β-ol-3,17-dione 3-ethylene ketal. | 16-Oximino-4-androstene-11β-ol-3,17-dione (F). |
| 1,4-Androstadiene-3,11,17-trione. | 16-Oximino-1,4-androstadiene-3,11,17-trione (G). |
| Estrone methyl ether | 16-Oximino-estrone methyl ether (H). |
| 1,4,9(11)-Androstatriene-3,17-dione. | 16-Oximino-1,4,9(11)-androstatriene-3,17-dione (I). |
| 9α-Fluoro-1,4-androstadiene-3,11,17-trione. | 16-Oximino-9α-fluoro-1,4-androstadiene-3,11,17-trione (J). |
| 9α-Chloro-1,4-androstadiene-3,11,17-trione. | 16-Oximino-9α-chloro-1,4-androstadiene-3,11,17-dione (K). |
| 6α-Methyl-1,4-androstadiene-3,11,17-trione. | 16-Oximino-6α-methyl-1,4-androstadiene-3,11,17-trione (L). |
| 6α-Fluoro-1,4-androstadiene-3,11,17-trione. | 16-Oximino-6α-fluoro-1,4-androstadiene-3,11,17-trione (M). |

EXAMPLE 2

*16-Diazo-Androstane-3β-Ol-17-One*

Dissolve 2.5 g. of sodium hydroxide in 400 ml. of water contained in a 3 l. flask. Cool in ice and while stirring add 9.5 g. of 16-oximino-androstane-3β-ol-17-one. Then add 50 ml. of distilled chloramine-ether solution (prepared as per Inorganic Synthesis, vol. 1, p. 59, McGraw-Hill, New York 1939) and 800 ml. of ether. Stir for 12 hours and decant the yellow ether layer. Repeat the chloramine and ether treatment permitting the reaction mixture to attain room temperature. Decant the ether layer and combine the ether solutions. Wash the ether solution several times with 800 ml. portions of water. Dry the ether solution and evaporate to a residue yielding 7.5 g. of 16-diazo-androstane-3β-ol-17-one, M.P. 170–173° C. Purify by crystallization from methanol, M.P. 176–177.5° (dec.), $[\alpha]_D^{25}$ —119.5° (c. 0.896).

By substituting the other 16-oximino-17-keto compounds in Table I, Example 1, there are obtained the corresponding 16-diazo analogs as yellow crystalline substances as listed below.

TABLE II

| Starting Material | Product |
| --- | --- |
| Product (Table I): | |
| A | 16-Diazo-androstane-3α-ol-17-one (A). |
| B | 16-Diazo-androstane-3,17-dione (B). |
| C | 16-Diazo-4-androstene-3,17-dione (C). |
| D | 16-Diazo-5-androstene-3β-ol 17-one (D). |
| E | 16-Diazo-4-androstene-3,11,17-trione (E). |
| F | 16-Diazo-4-androstene-11β-ol-3,17-dione (F). |
| G | 16-Diazo-1,4-androstadiene-3,11,17-trione (G). |
| H | 16-Diazo-estrone 3-methyl ether (H). |
| I | 16-Diazo-1,4,9(11)-androstatriene-3,17-dione (I). |
| J | 16-Diazo-9α-fluoro-1,4-androstadiene-3,11,17-trione (J). |
| K | 16-Diazo-9α-chloro-1,4-androstadiene-3,11,17-trione (K). |
| L | 16-Diazo-6α-methyl-1,4-androstadiene-3,11,17-trione (L). |
| M | 16-Diazo-6α-fluoro-1,4-androstadiene-3,11,17-trione (M). |

The 3-acetate ester of 16-diazo-androstane-3β-ol-17-one, 16-diazo-androstane-3α-ol-17-one, and 16-diazo-5-androstene-3β-ol-17-one are each prepared by allowing to stand overnight at room temperature a solution of 1 gram of the respective 3-hydroxy androstane in 10 ml. of pyridine to which is added 1 ml. of acetic anhydride. Each solution is then poured into 100 ml. of water and the resultant precipitate filtered and recrystallized from ethyl acetate, to give, respectively, 3β-acetoxy-16-diazo-androstane-17-one (Product N), 3α-acetoxy-16-diazo-androstane-17-one (Product O), and 3β-acetoxy-16-diazo-5-androstene-17-one (Product P).

By substituting the anhydrides of other acids, such as propionic and valeric for acetic anhydride in the above procedure, there is obtained the corresponding 3-ester, i.e., the 3-propionate and 3-valerate, respectively of 16-diazo-androstane-3β-ol-17-one, 16-diazo-androstane-3α-ol-17-one and of 16-diazo-5-androstene-3β-ol-17-one.

EXAMPLE 3

*D-Nor-Androstane-3β-Ol-16β-Carboxylic Acid*

Dissolve 4 g. of 16-diazo-androstane-3β-ol-17-one in 280 ml. of dioxane-water (5:2). Irradiate the solution by means of Sylvania "Black Light" fluorescent tubes until nitrogen evolution ceases (about 36–40 hours). Concentrate on a rotary film evaporator. Dissolve residue in ether and extract with 0.1 N sodium hydroxide. Wash extracts with ether and filter. Acidify the filtrate with 3 N hydrochloric acid. Filter, wash with water, dry in vacuo. Triturate residue with hot acetone and recrystallize from aqueous acetone, D-nor-androstane-3β-ol 16β-carboxylic acid, M.P. 217.0–218.5° C. $[\alpha]_D^{25}$ —44.3° (c. 2.34).

Alternatively, in the above procedure, the ultraviolet light may be supplied by a Hanovia 200 or 400 watt Mercury lamp with a Pyrex or a Corax filter. When a Hanovia 200 watt lamp is used with a Corax filter, the photolysis reaction is completed in 2 to 4 hours.

In addition to watching the nitrogen evolution, the course of the photolysis reaction may be followed by comparing the ultraviolet absorption spectra of aliquots of the photolyzed solution. The reaction is complete when the characteristic ultraviolet absorption band of the 16-diazo-17-ketone (about 250 and 295 m$\mu$) disappears.

By substituting the diazo ketone of Table II prepared from the 16-oximino-ketones tabulated in Example 1, the corresponding D-nor-steroidal 16β-carboxylic acids are obtained as follows:

TABLE III

| Starting Material | Product |
|---|---|
| Product (Table II): | |
| A | D-Nor-androstane-3α-ol-16β-carboxylic acid. |
| B | D-Nor-androstane-3-one-16β-carboxylic acid. |
| C | D-Nor-4-androstene-3-one-16β-carboxylic acid. |
| D | D-Nor-5-androstene-3β-ol-16β-carboxylic acid. |
| E | D-Nor-4-androstene-3,11-dione-16β-carboxylic acid. |
| F | D-Nor-4-androstene-11β-ol-3-one-16β-carboxylic acid. |
| G | D-Nor-1,4-androstadiene-3,11-dione-16β-carboxylic acid. |
| H | D-Nor-1,3,5(10)-estratriene-3-ol-16β-carboxylic acid 3-methyl ether. |
| I | D-Nor-1,4,9(11)-androstatriene-3-one-16β-carboxylic acid. |
| J | 9α-Fluoro-D-nor-1,4-androstadiene-3,11-dione-16β-carboxylic acid. |
| K | 9α-Chloro-D-nor-1,4-androstadiene-3,11-dione-16β-carboxylic acid. |
| L | 6α-Methyl-D-nor-1,4-androstadiene-3,11-dione-16β-carboxylic acid. |
| M | 6α-Fluoro-D-nor-1,4-androstadiene-3,11-dione-16β-carboxylic acid. |
| N | 3β-Acetoxy-D-nor-androstane-16β-carboxylic acid. |
| O | 3α-Acetoxy-D-nor-androstane-16β-carboxylic acid. |
| P | 3β-Acetoxy-D-nor-5-androstene-16β-carboxylic acid. |

EXAMPLE 4

*D-Nor-Androstane-3β-Ol-16β-Carboxylic Acid Methyl Ester (16β-Carbomethoxy-D-Nor-Androstane)*

By treating D-nor-androstane-3β-ol-16β-carboxylic acid with diazomethane according to known esterification methods, there is obtained the methyl ester of this example. Recrystallize from ether-hexane, M.P. 133.5–134° C.

Alternatively, this compound is prepared by replacing the irradiation solvent of Example 3 by dioxane-methanol. After the irradiation, the reaction mixture is concentrated and the residue taken up in ether. The ether solution is dried, filtered and evaporated. The residue is recrystallized from ether-hexane to yield the methyl ester, 16β-carbomethoxy-D-nor-androstane.

Other esters are prepared in similar fashion by employing the appropriate alcohol in admixture with dioxane, such as, ethanol in dioxane which yields the corresponding 16-carboethoxy ester, and n-butanol in dioxane yielding the corresponding ester.

In similar manner, the 16β-carboxylic acids listed in Table III (Products A–P) are esterified utilizing the above described procedure.

I claim:

1. In the process for transforming a trans-fused cyclopentane to a trans-fused cyclobutane, the steps which comprise irradiating a trans-fused α-diazo-cyclopentanone with ultraviolet light in an inert, ultraviolet-transparent, organic solvent, said solvent being in admixture with a miscible component of the group consisting of water, lower aliphatic alcohols, ammonia, primary amines and secondary amines; and recovering the trans-fused cyclobutane thereby produced.

2. The process according to claim 1 wherein the reaction solvent is selected from the group consisting of aqueous dioxane and aqueous tetrahydrofuran.

3. In the process for preparing D-nor steroids, the steps which comprise subjecting a steroid having in the D-ring a diazo group adjacent to a keto group, to irradiation with ultraviolet light in an inert, ultraviolet-transparent, organic solvent, said solvent being in admixture with a miscible component of the group consisting of water, lower aliphatic alcohols, ammonia, primary amines and secondary amines; and recovering the D-nor steroid thereby produced.

4. In the process for preparing 16β-R-D-nor-steroids wherein R is selected from the group consisting of carboxyl, lower aliphatic esters thereof and amides thereof, the steps which comprise subjecting a 16-diazo-17-ketosteroid to irradiation with ultraviolet light in an inert, ultraviolet-transparent, organic solvent, said solvent being in admixture with a miscible component of the group consisting of water, lower aliphatic alcohols, ammonia, primary amines and secondary amines; and recovering the 16β-R-D-nor-steroid thereby produced.

5. In the process for preparing 16β-carboxy-D-nor steroids of the androstane and estrane series, the steps which comprise subjecting a 16-diazo-17-keto steroid of the androstane and estrane series to irradiation with ultraviolet light in an inert, ultraviolet-transparent, organic solvent, said solvent containing water; and recovering the 16β-carboxy-D-nor steroid thereby produced.

6. In the process for preparing a 16β-carboxy-D-nor steroid of the androstane series, the steps which comprise subjecting a 16-diazo-17-keto compound of the androstane series to ultraviolet light, in an inert, water-miscible, water-containing, organic solvent, said solvent transparent to ultraviolet light; and recovering the D-nor androstane carboxylic acid thereby produced.

7. A 16-diazo-17-keto compound having the following structural formula:

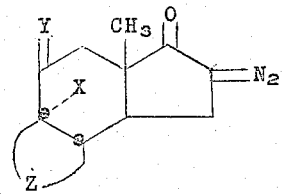

wherein X is a member selected from the group consisting of hydrogen and a halogen; Y is a member selected from the group consisting of hydrogen, keto, and (H, βOH), and when Y is hydrogen, X is hydrogen, and together X and Y represent an additional bond; and Z represents an A- and B-ring structure selected from the group consisting of:

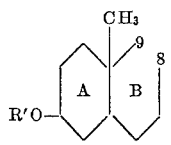 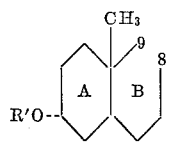

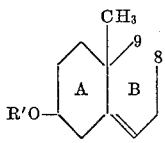 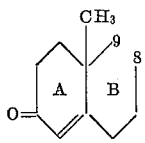

and

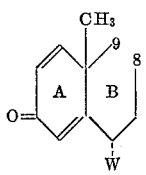

R' being a member selected from the group consisting of hydrogen and lower alkanoyl, and W being a member selected from the group consisting of hydrogen, methyl, and fluorine.

8. A 16-substituted D-nor steroid having the following structural formula:

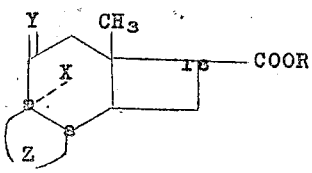

wherein R is a member selected from the group consisting of hydrogen and lower alkyl; X is a member selected from the group consisting of hydrogen and a halogen; Y is a member selected from the group consisting of hydrogen, keto, and (H, βOH), and when Y is hydrogen, X is hydrogen, and together X and Y represent an additional bond; and Z represents an A- and B-ring structure selected from the group consisting of:

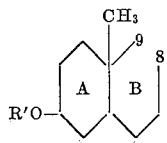 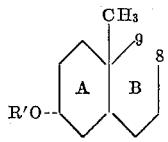

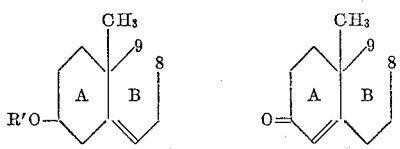

and

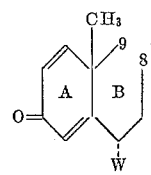

R' being a member selected from the group consisting of hydrogen and lower alkanoyl, and W being a member selected from the group consisting of hydrogen, methyl, and fluorine.

9. A 16-diazo-17-ketoandrostane selected from the group consisting of 16-diazoandrostane-3β-ol-17-one, the 3α-hydroxy epimer thereof, and the 5-dehydro analog thereof.

10. A 16-diazo-17-ketoandrostane selected from the group consisting of 16-diazoandrostane-3,17-dione, the 4-dehydro, and the 1,4,9(11)-tri-dehydro analogs thereof.

11. A 16-diazo-17-ketoandrostane selected from the group consisting of 16-diazo-4-androstene-3,11,17-trione, the 1-dehydro-, and the 6α-methyl-1-dehydro analogs thereof.

12. A 16-diazo-17-ketoandrostane selected from the group consisting of 16-diazo-4-androstene-11β-ol-3,17-dione, the 11α-hydroxy epimer thereof, and the 9α-fluoro-1-dehydro analog thereof.

13. A 16β-carboxylic acid-D-nor-androstane selected from the group consisting of D-nor-androstane-3β-ol-16β-carboxylic acid, the 3α-hydroxy epimer thereof, and the 5-dehydro analog thereof.

14. A 16β-carboxylic acid-D-nor-androstane selected from the group consisting of D-nor-androstane-3-one-16β-carboxylic acid, the 4-dehydro, and the 1,4,9(11)-tri-dehydro analogs thereof.

15. A 16β-carboxylic acid-D-nor-androstane selected from the group consisting of D-nor-4-androstene-3,11-dione-16β-carboxylic acid, the 1-dehydro-, the 6α-methyl-1-dehydro-, and the 6α-fluoro-1-dehydro analogs thereof.

16. A 16β-carboxylic acid-D-nor-androstane selected from the group consisting of D-nor-4-androstene-11β-ol-3-one-16β-carboxylic acid and the 9α-fluoro-1-dehydro analog thereof.

No references cited.